(12) United States Patent
Oshiro et al.

(10) Patent No.: US 7,779,367 B2
(45) Date of Patent: Aug. 17, 2010

(54) DYNAMIC CONTROL CONFIGURATION

(75) Inventors: Marc Seiji Oshiro, Seattle, WA (US); William Hong Vong, Hunts Point, WA (US); Jeffrey Neil Margolis, Seattle, WA (US); Veronica Law, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 11/703,955

(22) Filed: Feb. 8, 2007

(65) Prior Publication Data

US 2008/0195951 A1    Aug. 14, 2008

(51) Int. Cl.
   *G06F 3/00*    (2006.01)
   *G06F 3/048*    (2006.01)
(52) U.S. Cl. .................. 715/815; 715/765; 715/788; 715/800
(58) Field of Classification Search ............ 715/716, 715/719, 744, 764, 781, 788, 800, 810, 815, 715/825, 835, 866, 205, 243, 252
   See application file for complete search history.

(56) References Cited

U.S. PATENT DOCUMENTS

| | | | |
|---|---|---|---|
| 5,644,737 A | | 7/1997 | Tuniman et al. |
| 5,682,487 A | * | 10/1997 | Thomson ............... 715/800 |
| 5,699,535 A | * | 12/1997 | Amro .................... 715/800 |
| 6,057,836 A | * | 5/2000 | Kavalam et al. ......... 715/779 |
| 6,072,486 A | | 6/2000 | Sheldon et al. |
| 6,075,534 A | | 6/2000 | VanBuskirk et al. |
| 6,300,947 B1 | * | 10/2001 | Kanevsky ............... 715/866 |
| 6,335,743 B1 | * | 1/2002 | Owings ................. 715/801 |
| 6,421,065 B1 | | 7/2002 | Walden et al. |
| 6,448,986 B1 | * | 9/2002 | Smith ................... 715/801 |
| 7,030,890 B1 | * | 4/2006 | Jouet et al. ............. 345/619 |
| 7,287,233 B2 | * | 10/2007 | Arend et al. ............ 715/795 |
| 2003/0025737 A1 | * | 2/2003 | Breinberg .............. 345/801 |
| 2003/0103079 A1 | | 6/2003 | Adatia et al. |
| 2003/0187744 A1 | | 10/2003 | Goodridge, Jr. |
| 2003/0237043 A1 | | 12/2003 | Novak et al. |
| 2004/0174398 A1 | | 9/2004 | Luke et al. |
| 2004/0261040 A1 | | 12/2004 | Radcliffe et al. |
| 2005/0091107 A1 | | 4/2005 | Blum |
| 2005/0146534 A1 | | 7/2005 | Fong et al. |
| 2005/0149878 A1 | * | 7/2005 | White et al. ............. 715/784 |
| 2005/0193090 A1 | | 9/2005 | Ingram et al. |
| 2006/0085763 A1 | * | 4/2006 | Leavitt et al. ........... 715/810 |
| 2006/0139312 A1 | | 6/2006 | Sinclair, II et al. |

(Continued)

OTHER PUBLICATIONS

"Use Mini Player Mode", Date: Feb. 2005, http://www.microsoft.com/windows/windowsmedia/player/9series/howto/usingminiplayer.aspx.

(Continued)

*Primary Examiner*—X. L Bautista (57) ABSTRACT

A toolbar displays dynamically configured controls based on a size of a window in which an application is running and on the media type presented. A large set of available controls may be available for the toolbar; however, the size of the application window in which the application is running may not be able to display all of the available controls in the window in such as way as to be comfortably used by a user. Accordingly, the controls may be scaled, filtered, and interchanged according to the "real estate" available in the application window, as well as other contextual aspects of the application, to provide a more user-friendly experience.

20 Claims, 6 Drawing Sheets

U.S. PATENT DOCUMENTS

| | | | |
|---|---|---|---|
| 2006/0236264 A1* | 10/2006 | Cain et al. | 715/788 |
| 2007/0013609 A1* | 1/2007 | Crow et al. | 345/1.1 |
| 2007/0106952 A1* | 5/2007 | Matas et al. | 715/764 |
| 2007/0136684 A1* | 6/2007 | Morrow et al. | 715/798 |
| 2008/0034317 A1* | 2/2008 | Fard et al. | 715/781 |
| 2008/0052637 A1* | 2/2008 | Ben-Yoseph et al. | 715/800 |
| 2009/0024953 A1* | 1/2009 | Selig | 715/781 |

OTHER PUBLICATIONS

"Winamp Deskband 1.0 RC3", Date: 2001-2006, http://www.softpedia.com/get/Multimedia/Audio/Other-AUDIO-Tools/Winamp-Deskband-RC.shtml.

* cited by examiner

| Media | Size | Configuration |
|---|---|---|
| Video | $T_0 \leq x \leq Full$ | (1, (Play/Pause, Stop, Fast Forward, Rewind, Skip Forward, Skip Backward, Volume1, Repeat On/Off, Random/Sequential)) |
| Video | $0.85T_0 \leq x < T_0$ | (0.85, (Play/Pause, Stop, Fast Forward, Rewind, Skip Forward, Skip Backward, Volume1, Repeat On/Off, Random/Sequential)) |
| Video | $0.75T_0 \leq x < 0.85T_0$ | (0.85, (Play/Pause, Stop, Fast Forward, Rewind, Skip Forward, Skip Backward, Volume1)) |
| Video | $0.65T_0 \leq x < 0.75T_0$ | (0.85, (Play/Pause, Stop, Fast Forward, Rewind, Volume2)) |
| Video | $0.5T_0 \leq x < 0.65T_0$ | (0.85, (Play/Pause, Fast Forward, Rewind, Volume3)) |
| Audio | $T_1 \leq x \leq Full$ | (1, (Play, Stop, Increment Preset, Decrement Preset, Scan Forward, Scan Backward, Volume1)) |
| Audio | $0.85T_1 \leq x < T_1$ | (0.8, (Play, Stop, Increment Preset, Decrement Preset, Scan Forward, Scan Backward, Volume1)) |
| Audio | $0.7T_1 \leq x < 0.85T_1$ | (0.8, (Play, Stop, Increment Preset, Decrement Preset, Volume2)) |
| Audio | $0.5T_1 \leq x < 0.7T_1$ | (0.7, (Play, Stop, Volume3)) |
| ... | ... | ... |

| Media | Exclusion Priority | Control Group | |
|---|---|---|---|
| | | Control Configurations | |
| | | Group Replacement Priority | Configuration |
| Video | 10 | 0 | Stop |
| | 20 | 0 | Skip Back<br>Rewind<br>Play / Pause<br>Fast Forward<br>Skip Forward |
| | | 1 | SkipBack/Rewind<br>Play / Pause<br>FFWD / SkipForward |
| | | 2 | Play / Pause |
| | 30 | 0 | Mute<br>Volume Down<br>"Vol" text<br>Volume Up |
| | | 1 | SkipBack/Rewind<br>Play / Pause<br>FFWD / SkipForward |
| | | 2 | Mute<br>Button that rings up volume slider |
| Audio | 10 | 3 | Mute |
| | | 0 | Stop |
| ... | ... | ... | ... |

Fig. 4

Fig. 5 ically application. A second application window 106 represents an application window for the same media application that has been reduced to a smaller window size. It should also be understood that an application window may be set to full screen size. Furthermore, a software application may include stand-alone applications, utilities, operating system components, etc.
DYNAMIC CONTROL CONFIGURATION

BACKGROUND

Media applications in computing environments provide a variety of different media experiences. For example, a user may view video in a full screen mode, a windowed mode, or a background mode on a desktop or laptop computer or a portable digital media device. The varying scales of the display real estate available in each of these modes introduces challenges in providing consistent media controls (e.g., play, stop, pause, rewind, volume, etc.) that are appropriate for the available display real estate and other characteristics (e.g., the need to accommodate user input through a touch screen). Existing media controls obscure portions of the screen, are difficult to control through a touch screen, and do not scale well in functionality according to the context of the media application or size of the media application.

SUMMARY

Implementations described and claimed herein address the foregoing problems by providing dynamically configured controls for a toolbar based on a size of a window in which an application is running, on the media type presented, and potentially on other characteristics (e.g., touch screen capabilities). A large set of available controls may be available for the toolbar; however, the size of the application window in which the application is running may not be able to display all of the available controls in the window in such as way as to be comfortably used by a user. Accordingly, the controls may be scaled, filtered, and interchanged according to the "real estate" available within the application window, as well as other contextual aspects of the application, to provide a more user-friendly experience.

Dynamic configuration of controls for a toolbar based on application window size may be employed on a variety of computing systems, including desktop and laptop computers, portable media players, personal digital assistants, mobile telephones, smart phones, etc. Such computing systems may or may not support touch screens.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTIONS

Figure 1:
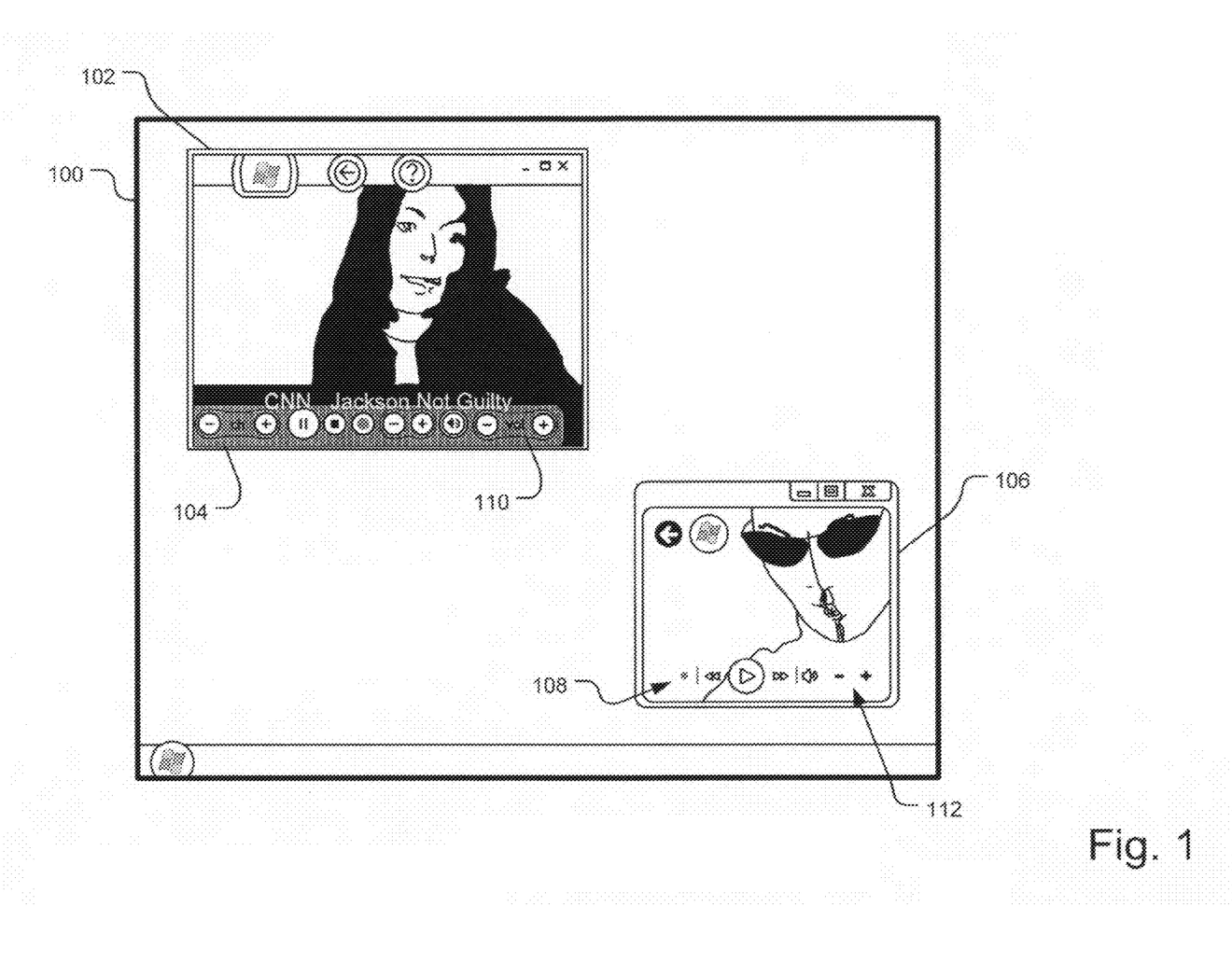
FIG. 1 illustrates example implementations of toolbars having dynamically configured controls.

FIG. 1 illustrates example implementations of toolbars having dynamically configured controls. A screenshot 100 depicts an application window 102 showing a full toolbar 104, which is shown as an overlay, with a complete selection of controls available for the corresponding media application (e.g., a video player). It should be understood that the controls displayed in the toolbar 104 are provided as examples only and that other controls may be made available for any particularly application. A second application window 106 represents an application window for the same media application that has been reduced to a smaller window size. It should also be understood that an application window may be set to full screen size. Furthermore, a software application may include stand-alone applications, utilities, operating system components, etc.

The second application window 106 is clearly smaller than the application window 102 and cannot accommodate the full toolbar 104. As such, the application has dynamically configured a new toolbar 108, which is also shown as an overlay, according to the size and context of the application window 106. In this case, a configuration having smaller controls and fewer controls is displayed in the toolbar 108 to accommodate the smaller size of the application window 106. It should also be noted that, for certain controls, the type of control has also changed (e.g., the volume control 110 has changed to a more concise control 112, which lacks the text and the ornamentation). It should be understood, however, that such toolbars may or may not be displayed as overlays.

In one implementation, the application determines the size of the application window and determines a configuration of controls to display in the toolbar. An individual configuration of controls may be scaled from a base size, may include a selected subset of the controls that are available in the toolbar, and/or may include a different type of a control as compared to other configurations. For example, as the user shrinks the application window down from full screen to a non-full screen size, the toolbar may remain unchanged. However, as the application window gets smaller than a base toolbar size T, the application begins to select different configurations of controls from a table or other datastore, based on the determined size of the application window (e.g., the width of the window).

For example, for an application window having a size between the base toolbar size T and 85% of T, the application can display a scaled toolbar representation having individual scaled controls. As the application window gets smaller than a specified threshold size (e.g., wherein the width of the application window is 85% of the T), the application begins to select different configurations of controls having different numbers and/or choices of controls (e.g., certain controls can be omitted from the toolbar, different controls for the same feature may be displayed, etc.). In this manner, the application can determine an appropriate configuration of controls to present to the user as the application window size changes.

It should also be understood that the different control configurations may be dynamically determined based on other characteristics of the media application. For example, if the computing system executing or displaying the application window supports touch-screen capabilities, an alternative configuration may be selected by the application. In one implementation, the selections of various control configurations may differ depending on whether a touch screen is supported because touch screen usage may not support as small a scaling as non-touch screen usage.

Likewise, the configuration may also vary depending on the media upon which the application operates (e.g., different configurations between streaming video media and recorded video media or between video media and audio only media). In one implementation, video and audio applications may select relatively different controls at different window size points with different scaling factors because of the individual characteristics of the media and media application. For example, video applications tend to maximize visible space within the application window in which to present the video, whereas an audio application does not need as much visible space. Therefore, as the window size decreases, the system can alter an audio control toolbar differently than a video control toolbar within an application window.

Figure 2:
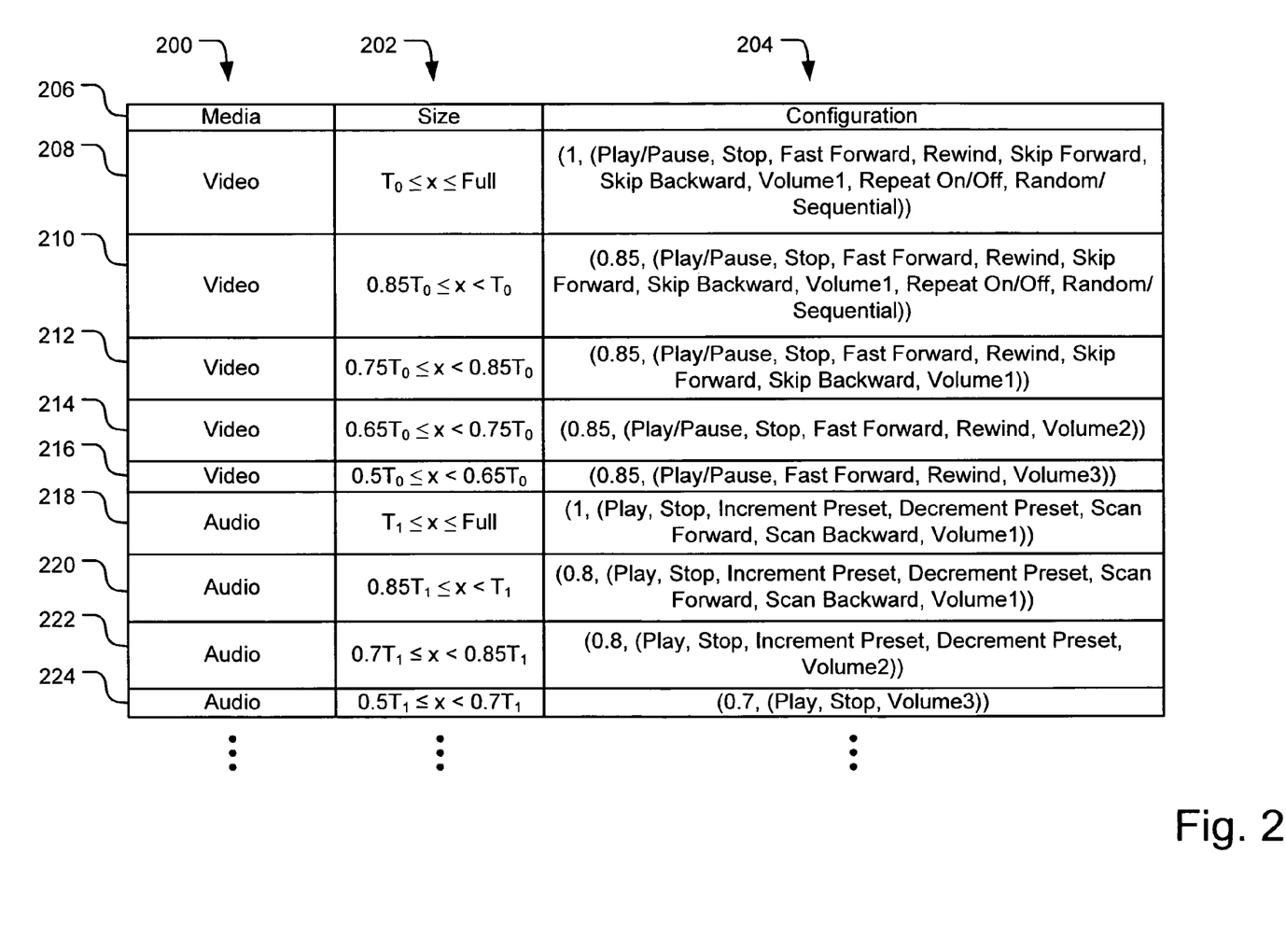
FIG. 2 illustrates an example selection scheme data store for toolbar control configurations based on application window size.

FIG. 2 illustrates an example selection scheme data store for toolbar control configurations based on application window size. In the illustrated implementation, the selection scheme is defined in part by a table of media type conditions 200, size conditions 202, and control configurations 204 recorded in a configuration table 206. However, it should be understood that other parameters, such as system capabilities (e.g., touch screen support) may be considered to determine an appropriate configuration and the selection scheme may be maintained in non-tabular form.

In a first table entry 208, a configuration is defined for a toolbar associated with playing video media in an application window having a size between a base toolbar size $T_0$ and full screen size. A complete selection of controls (unscaled, as represented by the value "1") is listed in the configuration column 204.

In a second table entry 210, a configuration is defined for a toolbar associated with playing video media in an application window having a size between 85% of the base toolbar size $T_0$ and the full base toolbar size $T_0$. A complete selection of controls (scaled, as represented by the value "0.85") is listed in the configuration column 204. It should be understood that variably scaled configurations may also be applied (e.g., a linear scaling between 100% and 85%, incrementally stepped down scaling between 100% and 85%, etc.). Furthermore, the 85% condition is merely used as an example and other scaling thresholds may also be used.

In a third table entry 212, a configuration is defined for a toolbar associated with playing video media in an application window having a size between 75% of the base toolbar size $T_0$ and 85% of the base toolbar size $T_0$. A reduced selection of controls (scaled, as represented by the value "0.85") is listed in the configuration column 204.

In a fourth table entry 214, a configuration is defined for a toolbar associated with playing video media in an application window having a size between 65% of the base toolbar size $T_0$ and 75% of the base toolbar size $T_0$. A reduced selection of controls (scaled, as represented by the value "0.85") is listed in the configuration column 204, including a different (presumably, smaller) type of volume control. For example, a first volume control (e.g., volume1) may be represented by a full slider control and a mute control. A second volume control (e.g., volume2) may be represented, for example, by pair of "plus" and "minus" volume controls, but no mute control. A third volume control (e.g., volume3) may only provide a volume control that will display a pop-up slider control when selected. A fifth table entry 216 defines a configuration of controls having an even further reduced number of controls and the third volume control "volume3").

As the application window presenting video media is reduced in size, the application selects the appropriate configuration from the configuration column 204 as the application window size satisfies a size condition represented in the size column 202. The selected configuration of controls is then displayed to the user in the toolbar of the application.

As shown by table entries 218, 220, 222, and 224, control configurations may also vary according to the type of media on which the application is operating. As shown, the base toolbar size T may also be specified according to the type of media (e.g., $T_0$ versus $T_1$). Other media types and base toolbars are also contemplated and may be incorporated into the table.

It should also be understood that other characteristics of the application window may also be employed as control configuration criteria, including whether the display has a touch screen, whether the display is grey scale only, etc. For example, each of these characteristics may set an additional grouping of possible toolbar configurations in the data store. Accordingly, a toolbar configuration in an application window of size X on a touch screen display may have different controls than a toolbar configuration in an application window of size X on a touch screen display.

Figure 3:
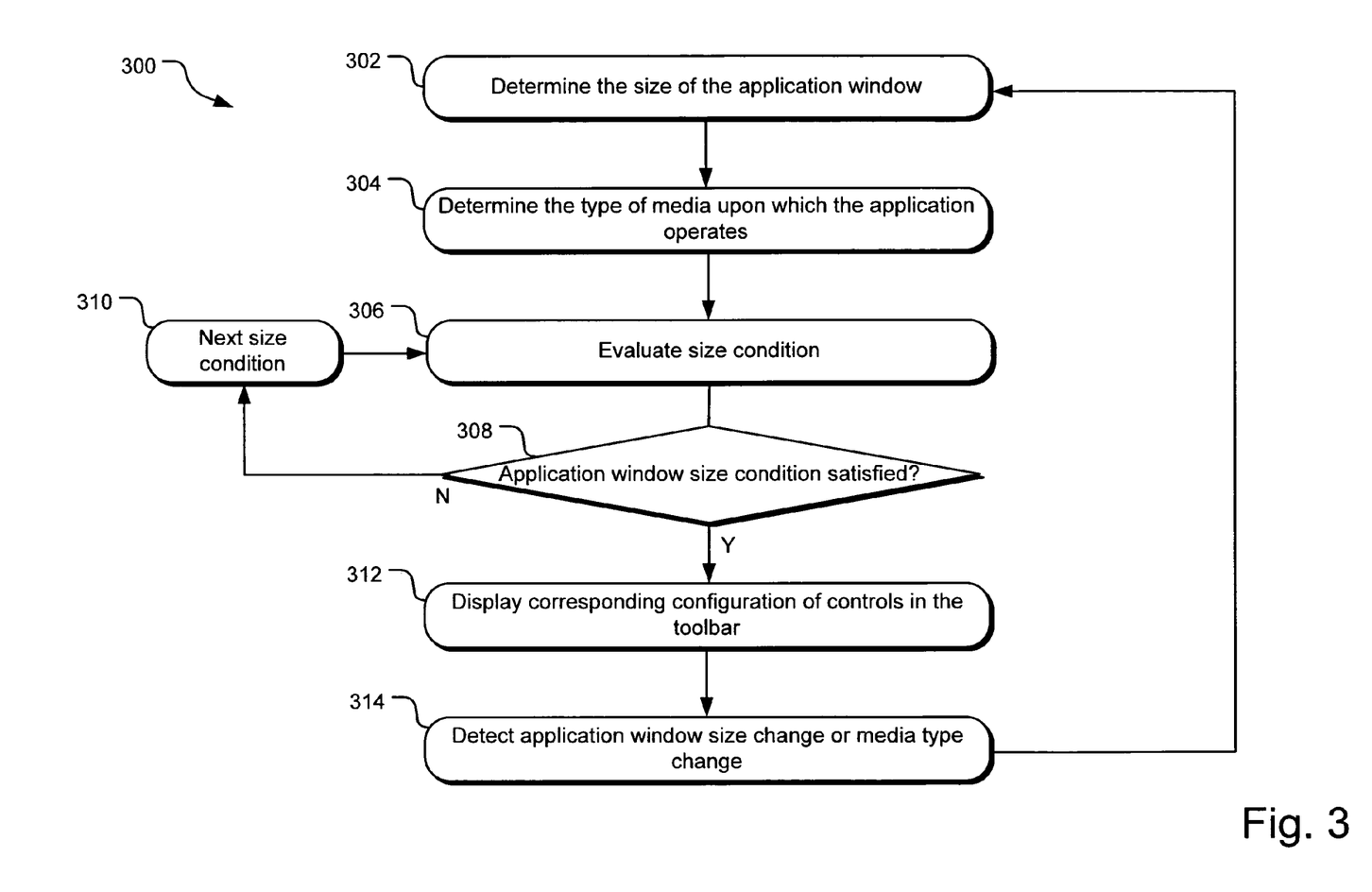
FIG. 3 illustrates example operations for selecting toolbar control configurations based on application window size.

FIG. 3 illustrates example operations 300 for selecting toolbar control configurations based on application window size. A determining operation 302 determines a size of the application window. In one implementation, the size is determined from a size property of the application window, although other methods of determining the size of an application window may be employed (e.g., computing the application window size from other parameters, including coordinates of vertices, etc.). Furthermore, size may represent a window segment length in one dimension (e.g., width or height), window segment lengths in multiple dimensions (e.g., width and height), a diagonal distance, or other size parameters (e.g., area).

Another determining operation 304 determines the type of media being played, recorded, etc. Example media may include without limitation streaming radio, video, or audio, recorded radio, video or audio, one or more still images, etc. The media type determination directs an evaluation operation 306 to evaluate a set of window size conditions associated with the determined media type.

The evaluation operation 306 evaluates the determined application window size to an application window size condition (such as one shown in the size column of the table of FIG. 2). If a decision operation 308 determines that the application window size does not satisfy the current size condition, then a next size condition is selected in incrementing operation 310, which is then evaluated in the evaluation operation 306. Otherwise, if the application window size condition is determined to be satisfied in the decision operation 308, then a displaying operation 312 displays in the toolbar the configuration of controls that correspond to the satisfied application window size condition.

At some later point in time, a detection operation 314 may detect a change in the application window size or media type and, therefore, direct processing to the determining operation 302 to possibly re-configure the controls in the toolbar of the application that satisfy the associated media type conditions.

Figure 4:
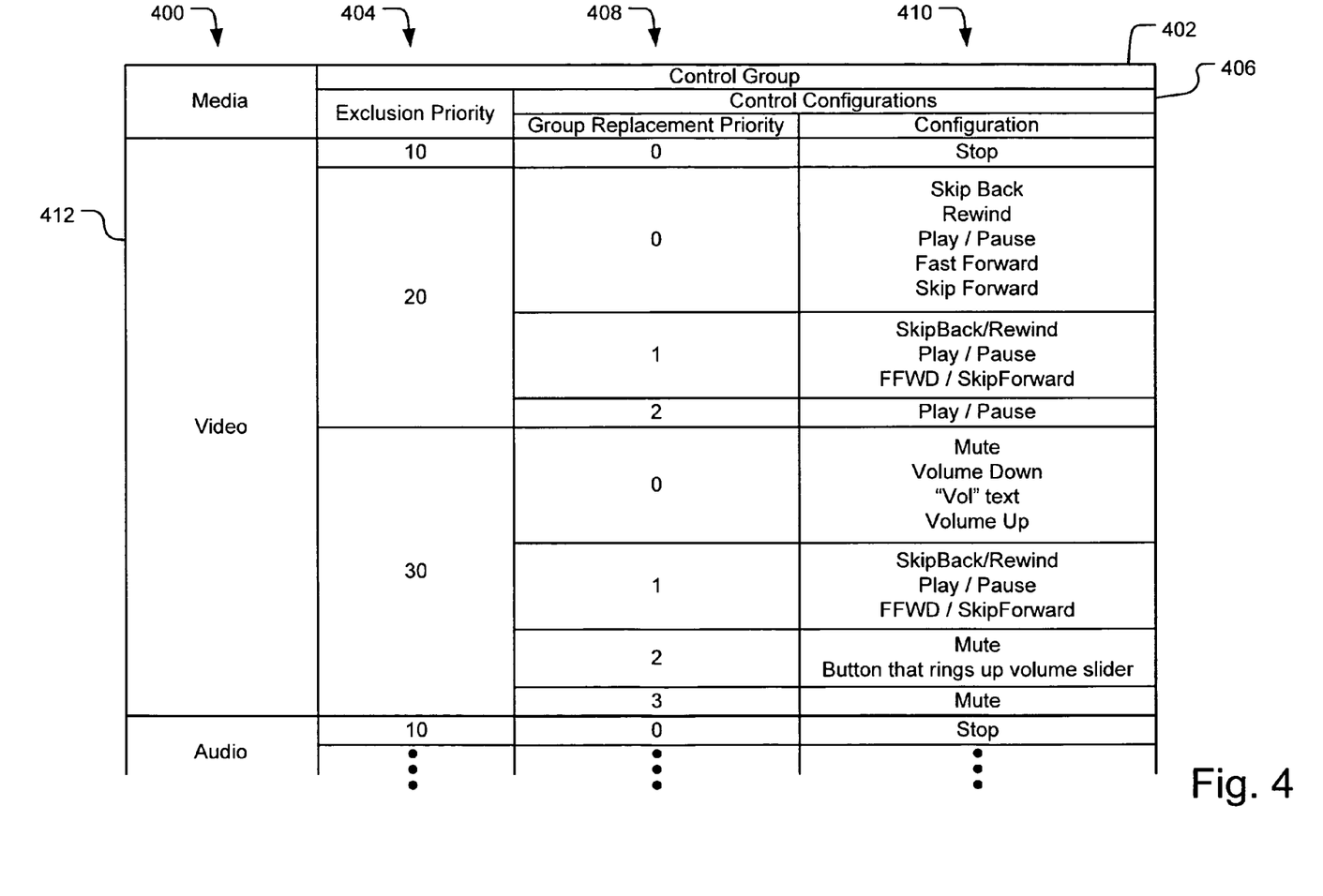
FIG. 4 illustrates an alternative example selection scheme data store for toolbar control configurations based on application window size.

FIG. 4 illustrates an alternative example selection scheme data store for toolbar control configurations based on application window size. In one alternative selection scheme, a designer can define a set of rules by which a valid toolbar may be dynamically constructed and rendered. In this manner, the designer can provide a richer set of toolbar configurations without defining every possible combination of toolbar configuration. In one implementation associated with the table in FIG. 4, controls can be combined into prioritized control groups, one or more of which can be selected for construction into a toolbar based on the total size of the constructed toolbar relative to the size of the application window.

In describing this implementation and the table in FIG. 4, some terminology will be used, which applies specifically to the description of the implementation of FIG. 4:

Toolbar Configuration—an ordered list of controls with or without an associated scale, wherein the toolbar is to be rendered in association with an application window for display to a user Media Type—the type of experience for which a toolbar configuration is being constructed (e.g., audio, video, etc.)

Exclusion Priority—a priority assigned to a toplevel control group that identifies a condition in which the top level control group should be omitted from the toolbar configuration Exclusion Level—the current exclusion priority (e.g., determined by an AdjustToolbar function) that is used to exclude control groups from a toolbar configuration; all control groups with an exclusion priority less than the passed-in exclusion level will be excluded from the toolbar configuration Control Groups—an ordered list of one or more predefined control configurations Grouping Replacement Priority—a priority assigned to each control configuration within a control group that is used to determine which configuration will be used for this control group Group Replacement Level—the current grouping replacement priority (e.g., determined by an AdjustToolbar function) that will be used to decide which configurations will be used by control groups In the illustrated implementation, an example selection scheme is defined in part by a table of one or more media type conditions 400 and one or more control groups 402. Each control group is defined by one or more exclusion priorities 404 and one or more control configurations 406. Each control configuration is defined by one or more group replacement priorities 408 and a one or more configurations 410. However, it should be understood that other parameters may be considered to determine an appropriate configuration and the selection scheme may be maintained in non-tabular form.

In one implementation, a call can be made to an AdjustToolbar function. A media type parameter identifies the control groups 402 available for use for toolbars playing video media. The media type condition allows a designer to define possible toolbar components to be appropriate for the type of media. For example, a brightness control may be appropriate for video but not for audio—the media type condition can manage such selectivity based on the type of media.

The exclusion priority parameter defines a level under which certain control configurations are omitted from a toolbar. For example, if an exclusion priority value of 20 is determined by the AdjustToolbar function, the control configurations associated with the exclusion priority of less than 20 are not considered for construction into the toolbar configuration displayed to the user.

The group replacement level parameter a level under (or equal to) which certain configurations are included. For example, if a group replacement level value of 2 is determined by the AdjustToolbar function, the controls in configurations associated with the exclusion priority of less than or equal to 2 are compiled into the toolbar configuration displayed to the user. Accordingly, in an example case of an exclusion level of 20 and a group replacement level of 0, the skip Back, Rewind, Play/Pause, Fast Forward, Skip Forward, Mute, Volume down, "Vol" text, and Volume Up controls will be displayed.

In one implementation, an example AdjustToolbar function determines the exclusion level and group replacement level automatically. For example, a nested loop may increment through the exclusion priorities and then, within each exclusion priority, loop increment through the group replacement priorities to determine which controls to display to the user in a constructed toolbar configuration. At each pair of exclusion and group replacement priorities, the resulting toolbar configuration is tested to determine whether it fits within the current application window size (e.g., a size condition is based on the current application window size). If not, the next priority is incremented (in accordance with the nested loop) to obtain, for example, the toolbar configuration with the most appropriate (and potentially richest) functionality and size.

It should be understood that the application may elect to scale the complete toolbar or a partial toolbar to fit within an application window. Such scaling may be employed in combination with the incremental, priority driven configuration scheme such as described with regard to FIG. 4. For example, scaling may be applied with a certain application window size range before using the configuration scheme of FIG. 4. Alternatively, although not specifically specified in the configuration scheme of FIG. 4, the individual control entry in the table can specify a scaled control (e.g., a 0.85 scaled Volume control specified in a configuration table entry). Another control entry parameter may specify a horizontally or vertically oriented toolbar (or alternatively, control). It should also be understood that the table may specify different versions of the same control (such as the individual volume up/down controls versus the volume slider control).

It should also be understood that other characteristics of the application window may also be employed as control configuration criteria, including whether the display has a touch screen, whether the display is grey scale only, etc. For example, each of these characteristics may set an additional grouping of possible toolbar configurations in the data store. Accordingly, a toolbar configuration in an application window of size X on a touch screen display may have different controls than a toolbar configuration in an application window of size X on a touch screen display.

Figure 5:
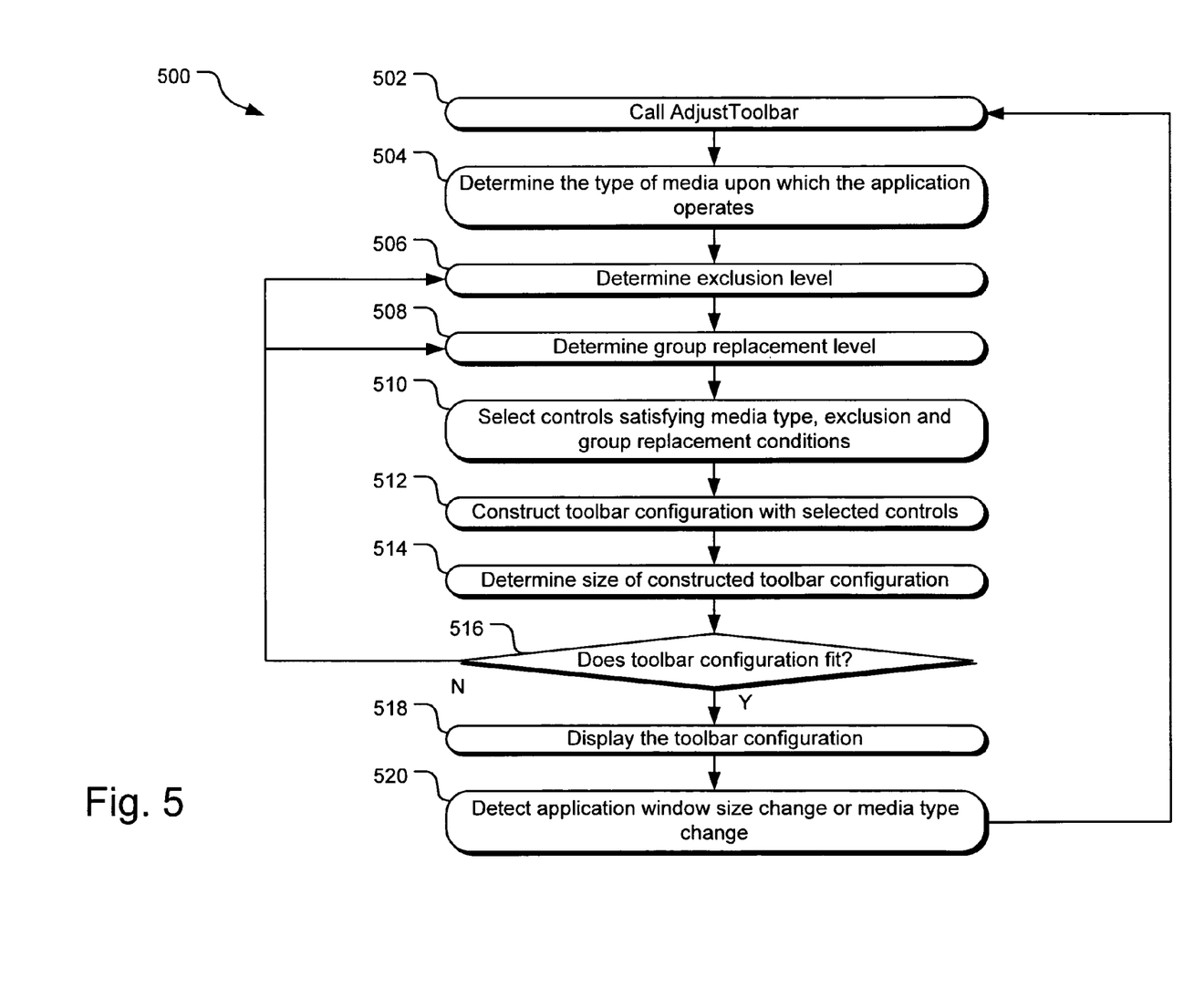
FIG. 5 illustrates alternative example operations for constructing toolbar control configurations based on application window size.

FIG. 5 illustrates alternative example operations 500 for constructing toolbar control configurations based on application window size. A calling operation 502 calls an AdjustToolbar function, which can be called whenever a change to the application window size is detected. In one implementation, the size is determined from a size property of the application window, although other methods of determining the size of an application window may be employed (e.g., computing the application window size from other parameters, including coordinates of vertices, etc.). Furthermore, size may represent a window segment length in one dimension (e.g., width or height), window segment lengths in multiple dimensions (e.g., width and height), or other size parameters (e.g., area).

A determining operation 504 determines the type of media being played, recorded, etc. The type of media can affect the control configuration that a user is likely to need in order to control the application. Example media may include without limitation streaming radio, video, or audio, recorded radio, video or audio, one or more still images, etc.

Another determining operation 506 determines an exclusion level. In one implementation, the AdjustToolbar function increments from 0 to a maximum value in a nested loop to seek through preset priority levels provided in a configuration table. Yet another determining operation 508 determines a group replacement level. In one implementation, the AdjustToolbar function increments from 0 to a maximum value in a nested loop to seek through preset priority levels provided in a configuration table.

In a selecting operation 510, a control configuration is selected from a configuration table based on the current media type, exclusion level, and group replacement level. For example, the controls matching the current media type, having an exclusion priority greater than or equal to the current exclusion level, and having a group replacement priority less than or equal to the current group replacement level are collected into a candidate toolbar configuration. In one implementation, the "current" value is determined by stepping through specific values in an iteration of a nested loop.

A construction operation 512 combines the selected controls into a toolbar configuration. A determination operation 514 determines the size of the constructed toolbar configuration (e.g., by adding up the size of the component controls or directly determining the area occupied by the constructed toolbar configuration).

If the constructed toolbar configuration is determined to fit within the size of the application window (e.g., by a decision operation 516), then a display operation 518 presents the constructed toolbar configuration, such as on a display device. In one implementation, the AdjustToolbar function passes the constructed toolbar configuration back to the calling routine for display. If the decision operation 516 determines that the constructed toolbar configuration does not fit within the application window, then, in one implementation, one or both of the exclusion level and the group replacement level are incremented according to a nested loop (as indicated by the double-headed arrow 517 to the determination operations 506 and 508) and the operations 510, 512, 514, and 516 are repeated.

A detection operation 520 detects a change to the application window size and/or media type and calls the AdjustToolbar function to adjust the toolbar configuration, if necessary.

Figure 6:
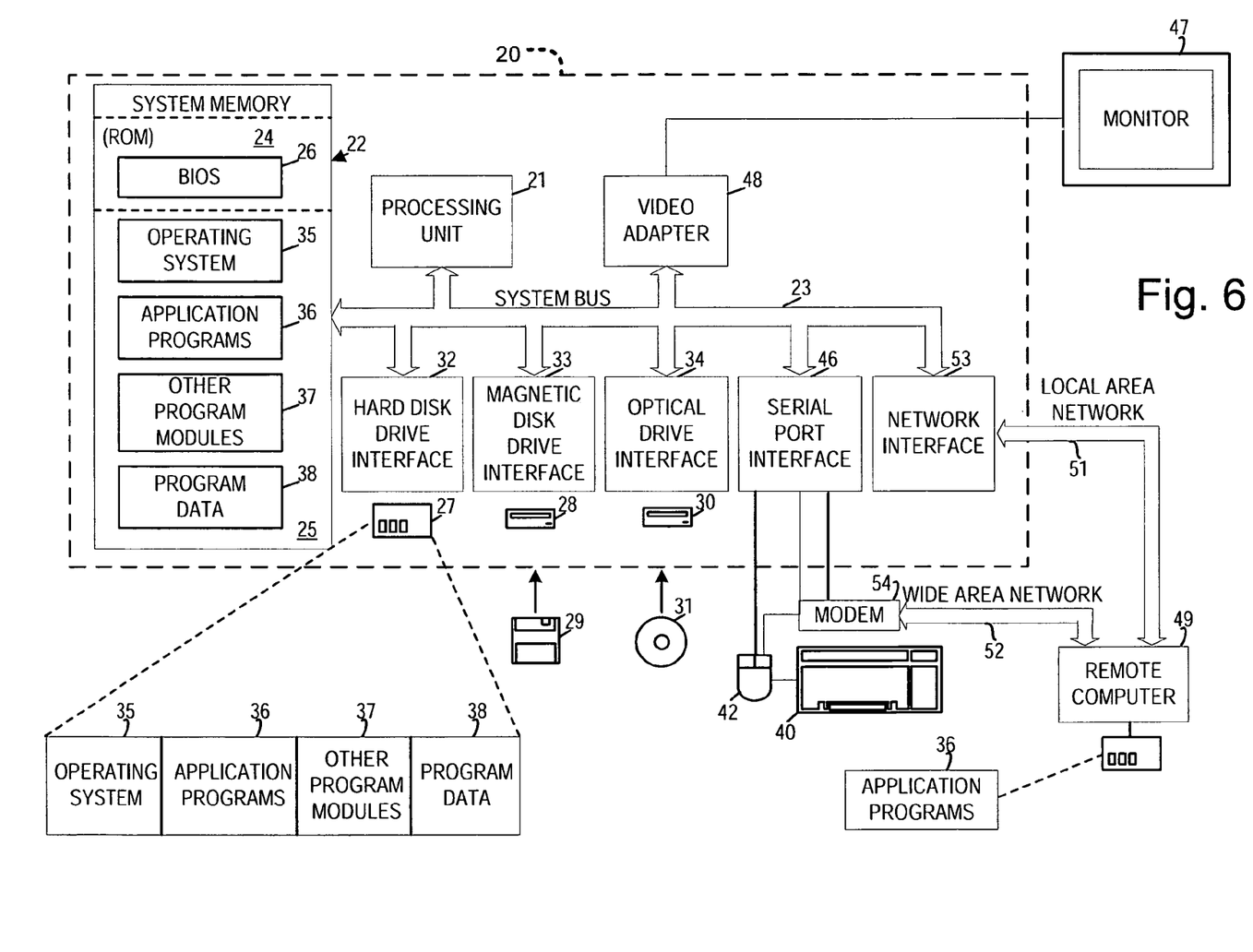
FIG. 6 illustrates an example system that may be useful for implementing the described technology.

The example hardware and operating environment of FIG. 6 for implementing the invention includes a computing device, such as general purpose computing device in the form of a gaming console or computer 20, a mobile telephone, a personal data assistant (PDA), a portable media player, a set top box, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40, a touch screen (not shown) and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display or output device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, a media application, a toolbar subsystem, and other modules may be embodied by instructions stored in memory 22 and/or storage devices 29 or 31 and processed by the processing unit 21. A toolbar control selection scheme data store, control objects, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make a numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A computer-implemented method comprising:
   determining a media type associated with media being played in an application window of a software application executing on a computing system and a reduced width of the application window in response to receiving user input to reduce the application window to a smaller window size;
   determining a base toolbar width of a full toolbar associated with playing the media;
   evaluating a set of predefined configurations specified for the media type for constructing a toolbar to be displayed in the application window having the smaller window size, wherein the set of predefined configurations includes:
   a first predefined configuration for constructing the full toolbar displaying a complete set of unscaled tool bar controls associated with playing the media when the reduced width of the application window is between a full window width and the base toolbar width,
   a second predefined configuration for constructing a scaled toolbar displaying a complete set of individual scaled toolbar controls associated with playing the media that includes a scaled version of each unscaled toolbar control in the full toolbar when the reduced window width is between the base toolbar width and a threshold percentage of the base toolbar width, and
   a group of predefined configurations for adjusting the scaled toolbar to display a fewer number of individual scaled toolbar controls associated with playing the media when the reduced window width is smaller than the threshold percentage of the base toolbar width, wherein the predefined configurations of the group are assigned different priority levels for selecting one or more different subsets of individual scaled toolbar controls associated with playing the media to be displayed in the application window having the smaller window size;
   selecting a configuration from the set of predefined configurations, specified for the media type; and
   displaying the media being played and a toolbar constructed based on the selected configuration in the application window having the smaller window size.

2. The method of claim 1 wherein the application window having the smaller window size is displayed on a touch screen.

3. The method of claim 1 wherein the unscaled toolbar controls in the full toolbar are scaled from the base toolbar width by a scaling factor less than one.

4. The method of claim 3 wherein the scaling factor is associated with the threshold percentage of the base toolbar width.

5. The method of claim 1 wherein the different subsets of individual scaled toolbar controls include a subset comprising scaled controls for fast forward and rewind.

6. The method of claim 1 wherein the group of predefined configurations includes at least one predefined configuration associated with a size condition that is satisfied when the reduced window width is between a first threshold percentage of the base toolbar width and a second threshold percentage of the base toolbar width.

7. The method of claim 1 wherein the group of predefined configurations includes at least one predefined configuration defining a different version of an individual scaled toolbar control than a version of the individual scaled toolbar control defined in the second predefined configuration.

8. The method of claim 7 wherein the at least one predefined configuration that defines the different version of the individual scaled toolbar control is associated with a size condition that is satisfied when the reduced window width is between a first threshold percentage of the base toolbar width and a second threshold percentage of the base toolbar width.

9. The method of claim 1 further comprising:
   selecting a configuration from the group of predefined configurations based on the priority levels assigned to the predefined configurations of the group when the reduced window width is smaller than the threshold percentage of the base toolbar width.

10. The method of claim 9 wherein each predefined configuration of the group is assigned an exclusion priority level and a group replacement priority level.

11. A tangible computer-readable storage medium having computer-executable instructions stored thereon that, when executed, cause a computing device to perform a computer process, the computer process comprising:
- determining a media type associated with media being played in an application window of a software application executing on the computing device and a reduced width of the application window in response to receiving user input to reduce the application window to a smaller window size;
- determining a base toolbar width of a full toolbar associated with playing the media;
- evaluating a set of predefined configurations specified for the media type for constructing a toolbar to be displayed in the application window having the smaller size, wherein the set of predefined configurations includes:
  - a first predefined configuration for constructing the full toolbar displaying a complete set of unscaled tool bar controls associated with playing the media when the reduced width of the application window is between a full window width and the base toolbar width,
  - a second predefined configuration for constructing a scaled toolbar displaying a complete set of individual scaled toolbar controls associated with playing the media that includes a scaled version of each unscaled toolbar control in the full toolbar when the reduced window width is between the base toolbar width and a threshold percentage of the base toolbar width, and
  - a group of predefined configurations for adjusting the scaled toolbar to display a fewer number of individual scaled toolbar controls associated with playing the media when the reduced window width is smaller than the threshold percentage of the base toolbar width, wherein the predefined configurations of the group are assigned different priority levels for selecting one or more different subsets of individual scaled toolbar controls associated with playing the media to be displayed in the application window having the smaller window size;
- selecting a configuration from the set of predefined configurations specified for the media type; and
- displaying the media being played and a toolbar constructed based on the selected configuration in the application window having the smaller window size.

12. The tangible computer-readable storage medium of claim 11 wherein the application window having the smaller window size is displayed on a touch screen.

13. The tangible computer-readable storage medium of claim 11 wherein unscaled toolbar controls in the full toolbar are scaled from the base toolbar width by a scaling factor less than one.

14. The tangible computer-readable storage medium of claim 13 wherein the scaling factor is associated with the threshold percentage of the base toolbar width.

15. The tangible computer-readable storage medium of claim 11 wherein the different subsets of individual scaled toolbar controls include a subset comprising scaled controls for fast forward and rewind.

16. The tangible computer-readable storage medium of claim 11 wherein the group of predefined configurations includes at least one predefined configuration associated with a size condition that is satisfied when the reduced window width is between a first threshold percentage of the base toolbar width and a second threshold percentage of the base toolbar width.

17. The tangible computer-readable storage medium of claim 11 wherein the group of predefined configurations includes at least one predefined configuration defining a different version of an individual scaled toolbar control than a version of the individual scaled toolbar control defined in the second predefined configuration.

18. The tangible computer-readable storage medium of claim 17 wherein the at least one predefined configuration that defines the different version of the individual scaled toolbar control is associated with a size condition that is satisfied when the reduced window width is between a first threshold percentage of the base toolbar width and a second threshold percentage of the base toolbar width.

19. A computing device comprising:
- memory storing computer-readable program code;
- a processing unit executing the computer-readable program code stored in the memory for:
  - determining a media type associated with media being played in an application window of a software application and a reduced width of the application window in response to receiving user input to reduce the application window to a smaller window size;
  - determining a base toolbar width of a full toolbar associated with playing the media;
  - evaluating a set of predefined configuration specified for the media type for constructing a toolbar to be displayed in the application window having the smaller window size, wherein the set of predefined configurations includes:
    - a first predefined configuration for constructing the full toolbar displaying a complete set of unscaled tool bar controls associated with playing the media when the reduced width of the application window is between a full window width and the base toolbar width,
    - a second predefined configuration for constructing a scaled toolbar displaying a complete set of individual scaled toolbar controls associated with playing the media that includes a scaled version of each unscaled toolbar control in the full toolbar when the reduced window width is between the base toolbar width and a threshold percentage of the base toolbar width, and
    - a group of predefined configurations for adjusting the scaled toolbar to display a fewer number of individual scaled toolbar controls associated with playing the media when the reduced window width is smaller than the threshold percentage of the base toolbar width, wherein the predefined configurations of the group are assigned different priority levels for selecting one or more different subsets of individual scaled toolbar controls associated with playing the media to be displayed in the application window having the smaller window size; and
  - selecting a configuration from the set of predefined configurations specified for the media type; and
- an output device for displaying the media being played and a toolbar constructed based on the selected configuration in the application window having the smaller window size.

20. The computing device of claim 19 wherein the second wherein the unscaled toolbar controls in the full toolbar are scaled from the base toolbar width by a scaling factor less than one.

* * * * *